US011820169B2

(12) United States Patent
Nakahashi et al.

(10) Patent No.: US 11,820,169 B2
(45) Date of Patent: Nov. 21, 2023

(54) WHEEL HOLDING MEMBER FOR A VEHICLE

(71) Applicant: TOYOTA JIDOSHA KABUSHIKI KAISHA, Toyota (JP)

(72) Inventors: Kazuki Nakahashi, Miyoshi (JP); Kenji Nakagawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/113,835

(22) Filed: Dec. 7, 2020

(65) Prior Publication Data

US 2021/0268832 A1    Sep. 2, 2021

(30) Foreign Application Priority Data

Mar. 2, 2020  (JP) ................................ 2020-034901

(51) Int. Cl.
*B60B 3/14*    (2006.01)
*B60B 3/16*    (2006.01)

(52) U.S. Cl.
CPC .............. *B60B 3/147* (2013.01); *B60B 3/145* (2013.01); *B60B 3/16* (2013.01)

(58) Field of Classification Search
CPC ........... B60B 3/14; B60B 3/145; B60B 3/147; B60B 3/16
USPC ................................................... 301/35.627
See application file for complete search history.

(56) References Cited

U.S. PATENT DOCUMENTS

| 2,051,953 | A | * | 8/1936 | Leathers | ............... | B60B 29/003 |
| | | | | | | 29/521 |
| 4,708,397 | A | * | 11/1987 | Weinmann | ............... | B60B 3/02 |
| | | | | | | 301/128 |
| 4,768,279 | A | * | 9/1988 | Lafferty | ............... | B60B 29/001 |
| | | | | | | 29/273 |
| 5,636,905 | A | * | 6/1997 | Pagacz | ................... | B60B 3/165 |
| | | | | | | 301/35.63 |
| 7,111,909 | B2 | * | 9/2006 | Andersen | ................. | B60B 3/16 |
| | | | | | | 29/273 |

(Continued)

FOREIGN PATENT DOCUMENTS

CN    201030765 Y     3/2008
JP     62-85710 U     6/1987

(Continued)

OTHER PUBLICATIONS

Notification of Reasons for Refusal dated Mar. 14, 2023 from the Japanese Patent Office in Application No. 2020-034901.

*Primary Examiner* — Jason R Bellinger
(74) *Attorney, Agent, or Firm* — Sughrue Mion, PLLC (57) ABSTRACT

The wheel holding member for a vehicle has a rod-like shape, and includes: a thread portion, which is formed on an end portion on a proximal end side, and has a male thread threadedly engageable with a hub bolt hole formed in a wheel hub; a holding portion, which protrudes toward a distal end side with respect to the thread portion, and has no thread on an outer periphery thereof; and a tool insertion hole, which is exposed from an end surface on the proximal end side, and to which a tool for rotating the wheel holding member is insertable. A bottom surface of the tool insertion hole is located on the distal end side with respect to an end of the thread portion on the distal end side.

8 Claims, 5 Drawing Sheets

(56) References Cited

U.S. PATENT DOCUMENTS

| | | | | |
|---|---|---|---|---|
| 7,178,880 B2* | 2/2007 | Andersen | ............... | B60B 29/00 29/273 |
| 9,032,600 B2* | 5/2015 | Pulphus | ................. | B60B 11/00 29/273 |
| 10,543,715 B2* | 1/2020 | Ryshavy | ............ | G06Q 30/0275 |
| 2006/0012240 A1* | 1/2006 | Andersen | ............... | B60B 29/00 301/35.629 |
| 2007/0257546 A1* | 11/2007 | Mitchel | .................... | B60B 3/16 301/35.627 |

FOREIGN PATENT DOCUMENTS

| | | |
|---|---|---|
| JP | 2012-512077 A | 5/2012 |
| JP | 2019-11827 A | 1/2019 |
| WO | 2010/070773 A1 | 6/2010 |

* cited by examiner

In ⟵              ⟶ Out

WHEEL HOLDING MEMBER FOR A VEHICLE

This application claims priority to Japanese Patent Application No. 2020-034901 filed on Mar. 2, 2020, incorporated herein by reference in its entirety.

BACKGROUND OF THE INVENTION

1. Field of the Invention

The present invention relates to a wheel holding member for a vehicle.

2. Description of the Related Art

In Japanese Patent Application Laid-open No. 2012-512077, there is disclosed a wheel holding member (referred to as "wheel guide" in Japanese Patent Application Laid-open No. 2012-512077) to be used during a replacement operation of a wheel. The wheel holding member has a rod-like shape, and has a thread portion at one end portion in a lengthwise direction. The wheel holding member has such a configuration that the thread portion is threadedly engaged with a bolt hole formed in a wheel nub so that the wheel holding member can be mounted to the wheel hub. When the wheel is to be mounted to the wheel hub, the wheel holding member is mounted to the wheel hub in advance, and the wheel holding member is inserted through a hub-bolt insertion hole formed in the wheel. With this, the wheel can be held under a state of being positioned with respect to the wheel hub. When the wheel is to be removed from the wheel hub, one of a plurality of hub bolts with which the wheel is fixed is replaced with the wheel holding member in advance. With this, the wheel is held by the wheel holding member so as to prevent the wheel from dropping off at the time point when all of the hub bolts are removed.

Incidentally, when the wheel collides against the wheel holding member mounted to the wheel hub during the replacement operation of a wheel, the wheel holding member may be broken. Further, the wheel is held by the wheel holding member, and hence the wheel holding member may be deteriorated and broken due to repeated use. When the wheel holding member is broken under the state of being mounted to the wheel hub, a part of the broken wheel holding member (hereinafter referred to as "broken piece" in some cases) may remain in the wheel hub. When a protrusion dimension of the broken piece remaining in the wheel hub from a surface of a wheel mounting surface is small, or the broken piece does not protrude from a surface of the wheel hub, it is difficult to grip and rotate the broken piece remaining in the wheel hub, with the result that the broken piece is difficult to be removed from the wheel hub. Therefore, in such a case, it is required to use the following method. Specifically, a threaded hole having a reverse thread is formed in the broken piece remaining in the wheel hub, a bolt having a reverse thread is threadedly engaged with the threaded hole formed in the broken piece, and the broken piece is rotated to remove the broken piece. Thus, the operation of removing the broken piece needs time and effort.

SUMMARY OF THE INVENTION

The present invention has been made in view of the above-mentioned problem, and has an object to provide a wheel holding member capable of easily removing a broken piece remaining in a wheel hub from the wheel hub even when the wheel holding member is broken under a state of being mounted to the wheel hub.

In order to solve the above-mentioned problem, according to at least one embodiment of the present invention, there is provided a wheel holding member (10, 20) for a vehicle, which has a rod shape, and is to be removably mounted to a wheel hub (30), the wheel holding member being configured to hold a wheel (32) under a state in which the holding member is mounted to the wheel hub (30), the wheel holding member including: a thread portion (11), which is formed on one end portion side in an axial direction (end portion on a proximal end side), and has a male thread formed on an outer peripheral surface thereof, the male thread being threadedly engageable with a hub bolt hole (303) formed in the wheel hub (30); and a first portion, which extends toward a side (distal end side) opposite to the one end portion of the thread portion (11) (end portion on the proximal end side), and is insertable through a hub-bolt insertion hole (322) formed in the wheel (32), wherein at least the thread portion (11) has a tool insertion hole (14), which is opened at an end surface of the one end portion, and into which a tool (40) for rotating the wheel holding member (10, 20) is insertable, and wherein the tool insertion hole (14) is formed such that a bottom surface (141) of the tool insertion hole is located on an outer side in a vehicle width direction with respect to a surface of the wheel hub (30) in which the hub bolt hole (303) is formed under a state in which the thread portion (11) is threadedly engaged with the hub bolt hole (303).

In this case, there can be applied a configuration in which the bottom surface (141) of the tool insertion hole (14) is located on the side (distal end side) opposite to the one end port ion (end portion on the proximal end side) with respect to a boundary (B) between the thread portion (11) and the first portion (holding portion (12)).

According to at least one embodiment of the present invention having the configuration described above, when the wheel holding member (10, 20) is broken under a state of being mounted to the wheel hub (30), the tool (40) is inserted into the tool insertion hole (14) exposed from a broken surface (16) of a broken piece (15) remaining in the wheel hub (30), and the broken piece (15) is rotated, thereby being capable of removing the broken piece (15) from the wheel hub (30).

There can be applied a configuration in which the first portion (holding portion (12)) has a portion having an outer diameter larger than an outer diameter of the thread portion (11).

According to at least one embodiment of the present invention having the configuration described above, when the first portion (holding portion (12)) is inserted into the hub-bolt insertion hole (322) of the wheel (32) under the state in which the wheel holding member (10, 20) is mounted to the wheel hub (30), axes of the hub bolt holes (303) formed in the wheel hub (30) and axes of the hub-bolt insertion holes (322) formed in the wheel (32) can be brought closer to each other. Therefore, the hub bolts (33) are easily fastened, thereby improving the operability.

There can be applied a configuration in which the wheel holding member (10, 20) further includes a second portion (grip portion (13)), which is formed on the side (distal end side) opposite to the one end portion (end portion on the proximal end side) with respect to the first portion (holding portion (121), and has a non-circular shape in cross section taken along a plane orthogonal to the axial direction.

According to at least one embodiment of the present invention having the configuration described above, when the wheel holding member (10, 20) is to be mounted to or removed from the wheel hub (30), the grip portion (13) is gripped and rotated so that torque is easily applied to the wheel holding member (10, 20). Therefore, the operability is improved.

In this case, there can be applied a configuration in which the second portion (grip portion (13)) has a substantially "I" shape in cross section.

There can be applied a configuration in which the second portion (grip portion (13)) has a tapered shape that becomes thinner toward an end portion on the side (end portion on the distal end side) opposite to the one end portion (end portion on the proximal end side).

According to at least one embodiment of the present invention having the configuration described above, the second portion (grip portion (13)) of the wheel holding member (10, 20) is easily inserted into the hub-bolt insertion hole (322) formed in the wheel (32).

There can be applied a configuration in which the wheel holding member for a vehicle further includes a tool portion (21), which is formed on the end portion on the side (end portion on the distal end side) opposite to the one end portion (end portion on the proximal end side), and is insertable into the tool insertion hole (14), thereby being capable of rotating the wheel holding member (20) under a state in which the tool portion (21) is inserted into the tool insertion hole (14). In this case, there can be applied a configuration in which the tool insertion hole (14) is a hole having a hexagonal cross section, and the tool portion (21) is a rod-shaped portion having a hexagonal cross section.

According to at least one embodiment of the present invention having the configuration described above, when the wheel holding member (20) is broken under the state of being mounted to the wheel hub (30), the tool portion (21) formed in a broken piece separated from the wheel hub (30) is inserted into the tool insertion hole (14) of the broken piece (15) remaining in the wheel hub (30), and the broken piece (15) is rotated, thereby being capable of removing the broken piece (15) from the wheel hub (30). Therefore, it is not required to use (prepare) a tool other than the wheel holding member (20) to remove the broken piece (15) remaining in the wheel hub (30).

A wheel holding member for a vehicle according to each of embodiments of the present invention is to be removably mounted to a wheel hub of a vehicle. The wheel holding member for a vehicle according to each of the embodiments of the present invention is used for holding a wheel during each of a replacement operation, a mounting operation, and a removing operation for a wheel of a vehicle. The wheel holding member for a vehicle according to each of the embodiments of the present invention is used for a vehicle having such a configuration that hub bolts are fastened to a wheel hub from an outer side in a vehicle width direction to mount a wheel to the wheel hub. The wheel holding member for a vehicle according to each of the embodiments of the present invention is a tool to be used by, for example, a user of a vehicle or a serviceman of a vehicle, and is provided as one of in-vehicle tools. In the following description, the "wheel holding member for a vehicle" may be simply referred to as "wheel holding member".

FIRST EMBODIMENT

Figure 1:
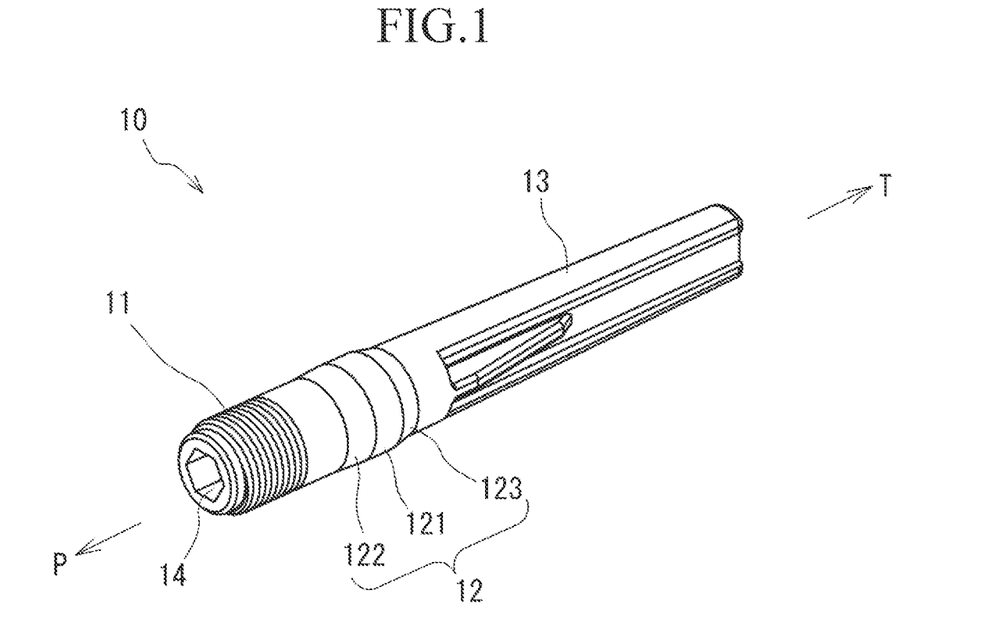
FIG. 1 is an exterior perspective view for illustrating a configuration example of a wheel holding member according to a first embodiment of the present invention.
Figure 2:
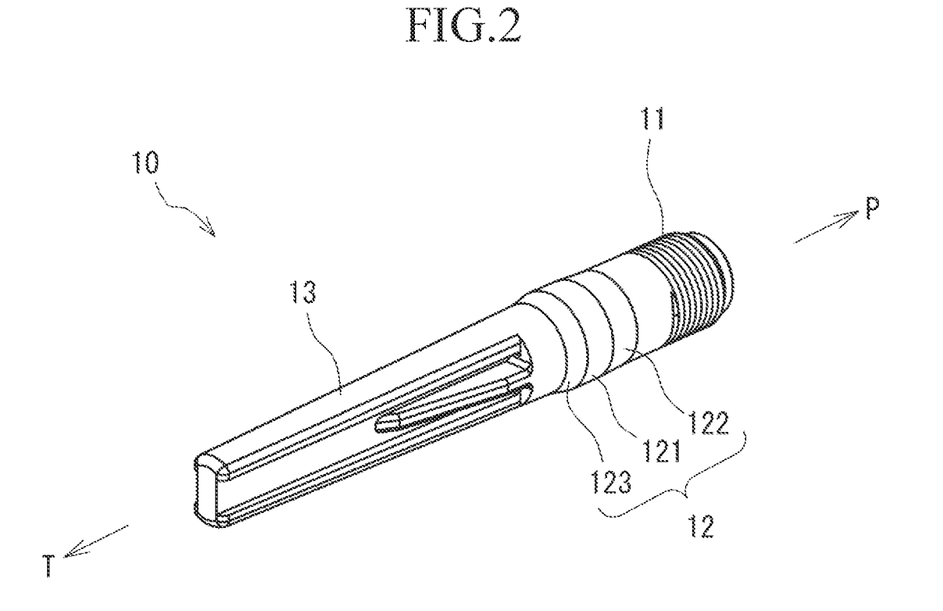
FIG. 2 is an exterior perspective view for illustrating the configuration example of the wheel holding member according to the first embodiment.
Figure 3:
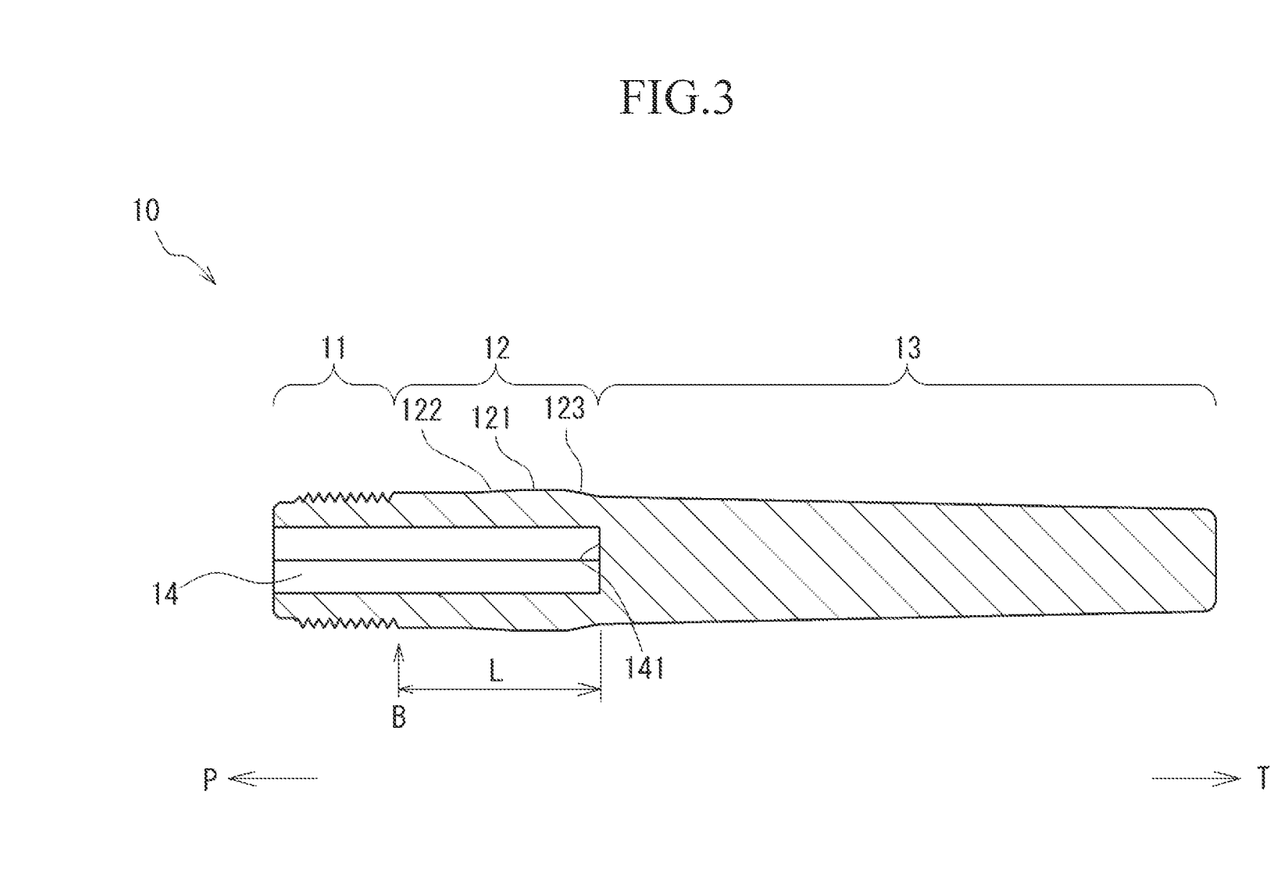
FIG. 3 is a sectional view for illustrating the configuration example of the wheel holding member according to the first embodiment.

As illustrated in FIG. 1 to FIG. 3, a wheel holding member 10 according to a first embodiment of the present invention has a rod-like shape. The wheel holding member 10 includes a thread portion 11, a holding portion 12, and a grip portion 13, which are arranged in the stated order from one end in an axial direction (that is, lengthwise direction). The holding portion 22 is an example of a first portion. The grip portion 13 is an example of a second portion. Further, a tool insertion hole 14 is formed in an end surface on a side on which the thread portion 11 is formed (that is, an end surface on one end). For convenience of description, in the lengthwise direction of the wheel holding member 10, the side on which the thread portion 11 and the tool insertion hole 14 are formed is referred to as "proximal end side", and a side opposite to the proximal end side is referred to as "distal end side". In the drawings, the proximal end side is indicated by the arrow "P", and the distal end side is indicated by the arrow "T".

Figure 4:
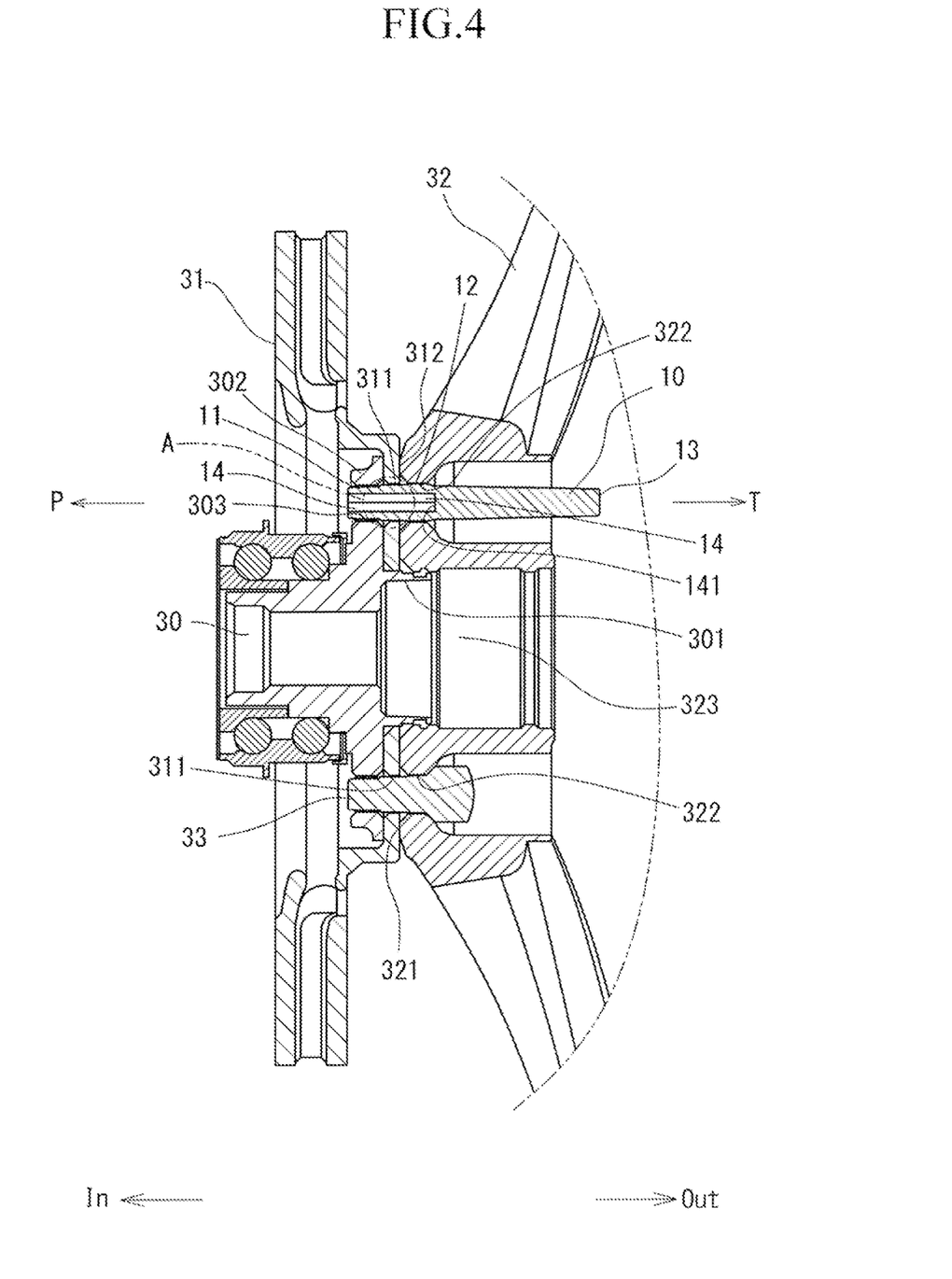
FIG. 4 is a sectional view for illustrating an example of a use state of the wheel holding member.
Figure 5:
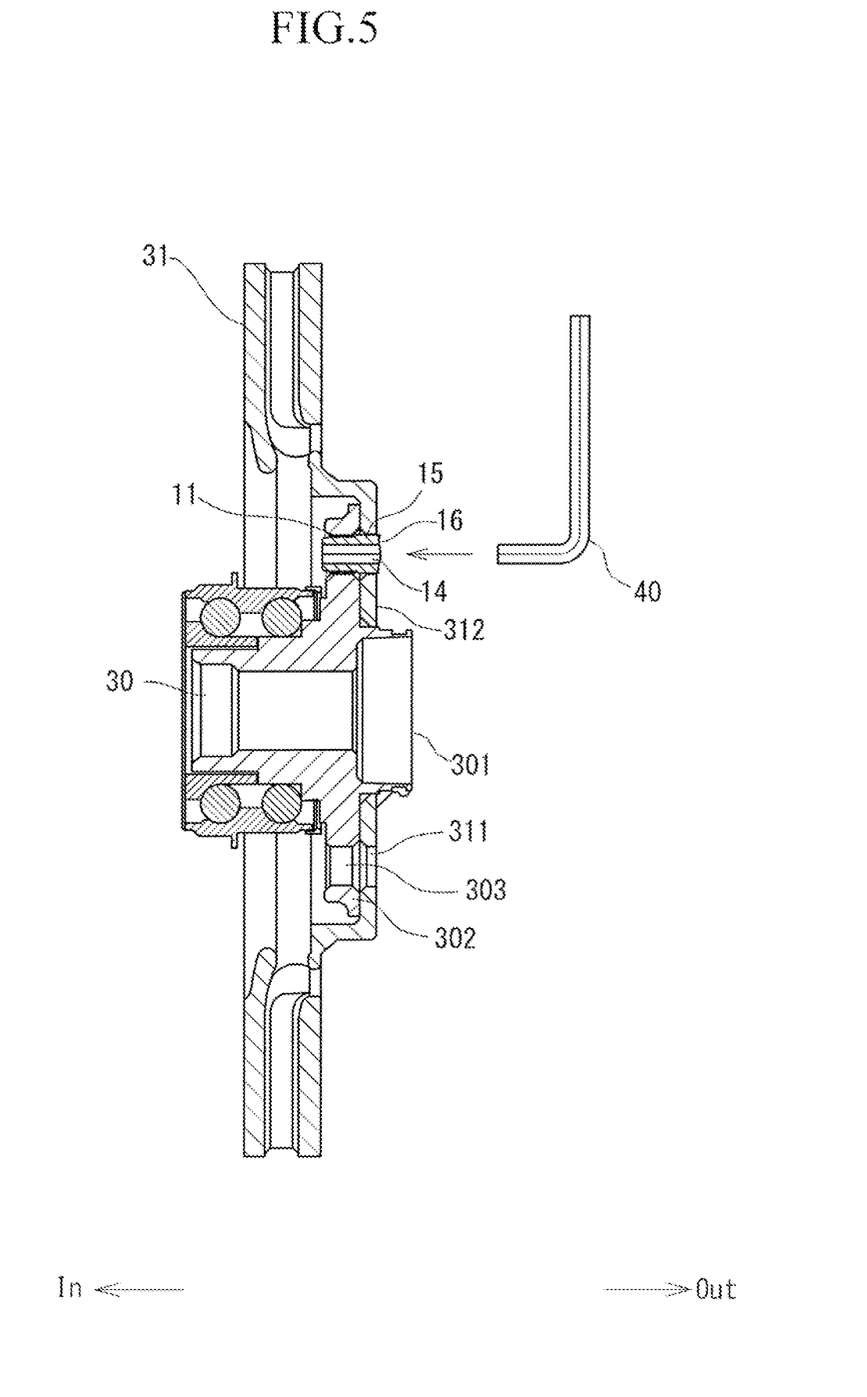
FIG. 5 is a sectional view for illustrating an example of a state in which the wheel holding member is broken.

The thread portion 11 is a portion having a substantially columnar shape with a thread (male thread) formed on an outer periphery thereof. The thread portion 11 is threadedly engageable with a hub bolt hole 303 (female thread) formed in a wheel hub 30 illustrated in FIG. 4 and FIG. 5 from the outer side in the vehicle width direction. In FIG. 4 and FIG. 5, the outer side in the vehicle width direction is indicated by the arrow "Out", and an inner side in the vehicle width direction is indicated by the arrow "In". The thread portion 11 is formed on the end portion on the proximal end side so that the wheel holding member 10 is threadedly engaged with the hub bolt hole 303 from the proximal end side. The length (axial dimension) of the thread portion 11 is not particularly limited, but is only required to be equal to or larger than the axial dimension of the hub bolt hole 303 (in other words, a thickness of a portion of the wheel, hub 30 at which the hub bolt hole 303 is formed) to which the thread portion 11 is to be fixed.

The holding portion 12 has a substantially columnar shape, and is insertable into a hub-bolt insertion hole 322 formed in the wheel 32. The holding portion 12 has no thread on an outer periphery thereof. The holding portion 12 has an outer diameter larger than an outer diameter of the thread portion 11. A portion 121 having the largest outer diameter in the holding portion 12 (hereinafter referred to as "large-diameter portion") has a columnar shape with a circular cross section (uniform sectional shape). Portions 122 and 123 are formed on a proximal end side and a distal end side of the large-diameter portion 121, respectively. The portions 122 and 123 each have a truncated conical shape gradually reduced in outer diameter as separating from the large-diameter portion 121. It is only required that the holding portion 12 partially have a portion having an outer diameter larger than the outer diameter of the thread portion 11, and the entire holding portion 12 may not have an outer diameter larger than the outer diameter of the thread portion 11. It is preferred that a portion closer to the thread portion 11 than the large-diameter portion 121 have an outer diameter larger than an inner diameter of the hub bolt hole 303 so that the holding portion 12 does not enter the hub bolt hole 303 of the wheel hub 30.

As illustrated in FIG. 4, the holding portion 12 is inserted t-rough the hub-bolt insertion hole 322 of the wheel 32 under a state in which the wheel holding member 10 is mounted to the wheel hub 30, thereby allowing the wheel 32 to be held by the wheel holding member 10. At this time, the wheel 32 is positioned with respect to the wheel hub 30. The description "positioned with respect to the wheel hub 30" refers to a state in which axes of the plurality of hub bolt holes 303 of the wheel hub 30 and axes of the plurality of hub-bolt insertion holes 322 of the wheel 32 match or substantially match each other such that hub bolts 33 can be inserted through the hub-bolt insertion holes 322 of the wheel 32 to be fastened to the wheel hub 30.

The large-diameter portion 121 of the holding portion 12 is insertable into the hub-bolt insertion hole 322 of the wheel 32. That is, the outer diameter of the large-diameter portion 121 of the holding portion 12 is smaller than an inner diameter of the hub-bolt insertion hole 322. It is preferred that the outer diameter of the large-diameter portion 121 be as large as possible to the extent that the large-diameter portion 121 is insertable into the hub-bolt insertion hole 322 in order to reduce displacement (or eliminate the displacement) between the axes of the hub-bolt insertion holes 322 and the axes of the hub bolt holes 303 under the state in which the wheel 32 is held by the wheel holding member 10. Therefore, the outer diameter of the large-diameter portion 121 is equal to or larger than the outer diameter of the thread portion 11 and smaller than the inner diameter of the hub-bolt insertion hole 322.

The grip portion 13 is formed to protrude from the holding portion 12 toward the distal end side. The grip portion 13 has such a configuration that, when the wheel holding member 10 is to be mounted to or removed from the wheel hub 30, a user grips and rotates the grip portion 13 so that the wheel holding member 10 can be rotated. The grip portion 13 has an outer diameter smaller than the inner diameter of the hub-bolt insertion hole 322 so that the grip portion 13 can be inserted through the hub-bolt insertion hole 322. Therefore, the outer diameter of the grip portion 13 is equal to or smaller than the outer diameter of the large-diameter portion 121.

The grip portion 13 has a non-circular shape in cross section orthogonal to the axial line so that a user can easily grip and rotate the grip portion 13. In this embodiment, the grip portion 13 has a substantially "I" shape in cross section. In order that a user can grip and rotate the grip portion 13 under the state in which the wheel 32 is mounted to the wheel hub 30, the length of the grip portion 13 is set to such a length that an end portion of the grip portion 13 on the distal end side protrudes from the wheel 32 toward the outer side in the vehicle width direction under the state in which the wheel holding member 10 is mounted to the wheel hub 30 and in which the wheel 32 is mounted to the wheel hub 30. A specific length of the grip portion 13 is set in accordance with a dimension of a wheel 32 of a vehicle to be applied in a vehicle width direction, and is not limited. Further, the grip portion 13 has a shape that becomes thinner from the proximal end side toward the distal end side (tapered shape). The grip portion 13 having a tapered shape can be easily inserted into the hub-bolt insertion hole 322 when the wheel 32 is to be mounted to the wheel hub 30.

The tool insertion hole 14 has such a configuration that a tool 40 illustrated in FIG. 5 can be inserted into the tool insertion hole 14 to rotate the wheel holding member 10. As illustrated in FIG. 5, the tool 40 is a tool for removing (eliminating), when the wheel holding member 10 is broken and a broken piece 15 remains in the hub bolt hole 303 of the wheel 32, the broken piece 15 remaining in the hub bolt hole 303 from the wheel hub 30 by rotating the broken piece 15. The tool 40 is a hex wrench. The tool insertion hole 14 is a hole having a substantially hexagonal cross section, into which the tool 40 is to be inserted. As illustrated in FIG. 3, the depth of the tool insertion hole 14 is larger than the axial dimension of the thread portion 11 (length from the end surface on the proximal end side). That is, a bottom surface 141 of the tool insertion hole 14 is located on the distal end side with respect to the end portion of the thread portion 11 on the distal end side (boundary between the thread portion 11 and the holding portion 12 and the position indicated by reference symbol "B" in FIG. 3).

The wheel holding member 10 is made of a resin material. The material of the wheel holding member 10 is not limited as long as the wheel holding member 10 has a strength that is sufficient for holding the wheel 32 under a state in which the wheel holding member 10 is mounted to the wheel hub 30, and may be, for example, iron, aluminum, or aluminum alloy.

Next, a method of use of the wheel holding member 10 is described. The wheel holding member 10 is used in each of an operation of replacing the wheel 32, an operation of removing the wheel 32 from the wheel hub 30, and an operation of mounting the wheel 32 to the wheel hub 30.

As illustrated in FIG. 4 and FIG. 5, the vehicle includes the wheel hub 30 and a brake rotor 31. The wheel hub 30 is rotatable with respect to a vehicle body. The wheel hub 30 includes a portion 301 having a cylindrical shape protruding toward the outer side in the vehicle width direction, and a portion 302 having a flange shape. The plurality of hub bolt holes 303 are equiangularly formed in the portion 302 having a flange shape. Further, the brake rotor 31 having a disc shape is mounted to the portion 302 having a flange shape. The brake rotor 31 has hub-bolt insertion holes 311, and the hub bolts 33 can be threadedly engaged with the hub bolt holes 303 of the wheel hub 30 from an outer side of the brake rotor 31 in the vehicle width direction.

FIG. 4 is an illustration of a state in which the wheel 32 is mounted to the wheel hub 30. As illustrated in FIG. 4, the portion 301 having a cylindrical shape of the wheel hub 30 is inserted into a wheel hub insertion hole 323 of the wheel 32, and a mounting surface 321 of the wheel 32 on the inner side in the vehicle width direction is brought into contact with a wheel mounting surface 312 of the brake rotor 31. Then, the hub bolts 33 are fastened to the wheel hub 30 through the hub-bolt insertion holes 322 of the wheel 32 (threadedly engaged with the hub bolt holes 303 of the wheel hub 30) from the outer side in the vehicle width direction. In FIG. 4, the hub bolt 33 is threadedly engaged with the hub bolt hole 303 located on a lower side, whereas the wheel holding member 10 is threadedly engaged with the hub bolt hole 303 located on an upper side in place of the hub bolt 33.

When the wheel 32 is to be removed from the wheel hub 30, first, one of the plurality of hub bolts 33 with which the wheel 32 is fixed to the wheel hub 30 is removed from the wheel hub 30, and the wheel holding member 10 is fastened to the wheel hub 30 instead. The one hub bolt 33 to be removed is generally a hub bolt 33 located at the highest position among the plurality of hub bolts 33. The "total length of the holding portion 12 and the grip portion 13" of the wheel holding member 10 is larger than a total thickness dimension in the vehicle width direction) of the portion of the brake rotor 31 at which the hub-bolt insertion hole 311 is formed and the wheel 32. Thus, even when the thread portion 11 is sufficiently threadedly engaged with the hub bolt hole 303 of the wheel hub 30, a part of the grip portion 13 on the distal end side protrudes toward the outer side in the vehicle width direction with respect to the surface of the wheel 32 on the outer side in the vehicle width direction. Therefore, a user rotates the grip portion 13 after gripping the grip portion 13 and inserting the thread portion 11 through the hub-bolt insertion hole 322 so that the thread portion 11 can be sufficiently threadedly engaged with the hub bolt hole 303 of the wheel hub 30. As described above, from the viewpoint of holding the wheel 32 by the wheel holding member 10 so as to prevent the wheel 32 from dropping off from the wheel hub 30, it is preferred that the hub bolt 33 located on an uppermost side be replaced with the wheel holding member 10.

After the wheel holding member 10 is mounted to the wheel hub 30, all of the other hub bolts 33 are removed from the wheel hub 30. When all of the hub bolts 33 are removed, the wheel 32 is brought into a state of being held by the wheel holding member 10 (in other words, a state in which the wheel 32 is suspended from the wheel holding member 10). Therefore, even when all of the hub bolts 33 are removed, the wheel 32 is prevented from dropping off immediately. After that, the wheel 32 is moved toward the outer side in the vehicle width direction so that the wheel holding member 10 is extracted from the hub-bolt insertion hole 322 of the wheel 32.

When the wheel 32 is to be mounted to the wheel hub 30, the thread portion 11 of the wheel holding member 10 is threadedly engaged with one of the plurality of hub bolt holes 303 so that the wheel holding member 10 is mounted to the wheel hub 30. It is preferred that, similarly to the operation of removing the wheel 32, the thread portion 11 of the wheel holding member 10 be threadedly engaged with (mounted to) the hub bolt hole 303 located on the uppermost side among the plurality of hub bolt holes 303 formed in the wheel hub 30. Further, when the wheel 32 is to be replaced, it is only required that the wheel holding member 10 mounted to the wheel hub 30 before the wheel 32 is removed be used as it is. Next, the wheel holding member 10 is inserted through one of the plurality of hub-bolt insertion holes 322 of the wheel 32, and the portion 301 having a cylindrical shape of the wheel hub 30 is inserted into the wheel hub insertion hole 323 of the wheel 32. After that, the mounting surface 321 of the wheel 32 is brought into contact with the wheel mounting surface 312 of the brake rotor 31.

With this, the wheel 32 is brought into the state of being held by the wheel holding member 10 (more precisely, by the wheel hub 30 through intermediation of the wheel holding member 10), and the wheel 32 is brought into the state of being positioned with respect to the wheel hub 30. That is, the axes of the hub-bolt insertion holes 322 of the wheel 32 and the axes of the hub bolt holes 303 of the wheel hub 30 match or substantially match each other. In this state, the hub bolts 33 are threadedly engaged with the hub bolt holes 303 with which the wheel holding member 10 is not threadedly engaged, thereby allowing the wheel 32 to be fixed to the wheel hub 30. Further, the wheel holding member 10 is removed from the wheel hub 30, and the hub bolt 33 is threadedly engaged with the hub bolt hole 303 from which the wheel holding member 10 has been removed. Then, the mounting of the wheel 32 is completed.

Incidentally, at the time of removing the wheel 32 from the wheel hub 30, when all of the other hub bolts 33 are removed from the wheel hub 30 under the state in which the wheel holding member 10 is mounted to the wheel hub 30, the wheel 32 moves downward due to the gravity by an amount corresponding to a gap between the outer periphery of the holding portion 12 and an inner periphery of the hub-bolt insertion hole 322. At this time, the wheel 32 collides against the wheel holding member 10, with the result that the wheel holding member 10 may be broken. Meanwhile, at the time of mounting the wheel 32 to the wheel hub 30, the wheel 32 collides against the wheel holding member 10 mounted to the wheel hub 30, with the result that the wheel holding member 10 may be broken. As described above, an impact load is applied to the wheel holding member 10 during use of the wheel holding member 10, with the result that the wheel holding member 10 may be broken. Besides, when the wheel holding member 10 is repeatedly used, the wheel holding member 10 may be broken due to fatigue or deterioration of the material.

Under the state in which the wheel holding member 10 is mounted to the wheel hub 30, a large load is applied to a root portion (Portion indicated by the reference symbol "A" in FIG. 4) of a portion protruding from the surface of the wheel hub 30 on the outer side in the vehicle width direction (surface in which the hub bolt hole 303 is formed). Therefore, the wheel holding member 10 is liable to be broken at the root portion. When the wheel holding member 10 is broken at the above-mentioned root portion, as illustrated in FIG. 5, the length of a portion of the broken piece 15 of the wheel holding member 10 that remains in the wheel hub 30, which protrudes from the surface of the wheel mounting surface 312 of the brake rotor 31, is small, or the broken piece 15 does not protrude from the surface of the wheel mounting surface 312 of the brake rotor 31.

The broken piece 15 remaining in the wheel hub 30 can be removed from the wheel hub 30 by being rotated. However, when the related-art wheel holding member is broken at the root portion as described above, it is difficult to grip and rotate the broken piece 15 remaining in the wheel hub 30. As illustrated in FIG. 4 and FIG. 5, the brake rotor 31 is mounted to the wheel hub 30, and it is difficult to access a surface of the wheel hub 30 on the vehicle inner side. Therefore, it is also difficult to rotate the broken piece 15 from the vehicle inner side of the wheel hub 30. The hub bolt 33 cannot be fastened unless the broken piece 15 of the wheel holding member 10 is removed from the wheel hub 30, and hence the vehicle cannot be used. In the case of the related-art wheel holding member, as a method of removing the broken piece remaining in the wheel hub 30, the following method can be used. Specifically, a hole is formed in a broken surface of the wheel holding member to form a female thread being a reverse thread, and a male thread being a reverse thread is threadedly engaged with the formed female thread being the reverse thread to rotate the broken piece through the male thread being the reverse thread. However, such a method needs time and effort. Further, tools for hole drilling and thread cutting are required.

In contrast, according to this embodiment, even when the wheel holding member 10 is broken at a part near the above-mentioned root portion, the broken piece 15 remaining in the wheel hub 30 can be easily removed from the wheel hub 30. Specifically, the tool insertion hole 14 is formed in the wheel holding member 10 according to this embodiment. The bottom surface 141 of the tool insertion hole 14 of the wheel holding member 10 is located on the distal end side with respect to the boundary B between the thread portion 11 and the holding portion 12. Therefore, when the thread portion 11 is threadedly engaged with the hub bolt hole 303, and the holding portion 12 is located on the outer side in the vehicle width direction with respect to the surface of the wheel hub 30 on the outer side in the vehicle width direction (surface in which the hub bolt hole 303 is formed), in other words, the holding portion 12 does not enter the hub bolt hole 303), the bottom surface 141 of the tool insertion hole 14 is located on the outer side in the vehicle width direction with respect to the surface of the wheel hub 30 on the outer side in the vehicle width direction. The outer diameter of the grip portion 13 is equal to or larger than the inner diameter of the hub bolt hole 303 of the wheel hub 30. Thus, the grip portion 13 does not enter the hub bolt hole 303. Therefore, the boundary B between the thread portion 11 and the holding portion 12 is located at the same position as the surface of the wheel hub 30 on the outer side in the vehicle width direction, or is located on the outer side in the vehicle width direction with respect to the surface of the wheel hub 30 on the outer side in the vehicle width direction. Therefore, the bottom surface 141 of the tool insertion hole 14 is located on the outer side in the vehicle width direction with respect to the surface of the wheel hub 30 on the outer side in the vehicle width direction. Therefore, as illustrated in FIG. 5, when the wheel holding member 10 according to this embodiment is broken at the above-mentioned root portion, the tool insertion hole 14 is exposed from a broken surface 16 (surface of the broken piece 15 on the outer side in the vehicle width direction). Then, the tool 40 is inserted into the exposed tool insertion hole 14, and the broken piece 15 is rotated, thereby being capable of removing the broken piece 15 remaining in the wheel hub 30.

In the example illustrated in FIG. 4 and FIG. 5, the brake rotor 31 is arranged so as to be overlaid on the surface of the wheel hub 30 on the outer side in the vehicle width direction. In such a configuration, in order that the tool insertion hole 14 is exposed from the broken surface 16 even when the wheel holding member 10 is broken on the outer side in the vehicle width direction with respect to the wheel mounting surface 312 of the brake rotor 31, a length L (see FIG. 3) from the boundary B between the thread portion 11 and the holding portion 12 to the bot-om surface 141 of the tool insertion hole 14 is set to be larger than the thickness of the brake rotor 31. When the bottom surface 141 of the tool insertion hole 14 is formed at such a position, even under a state in which the entire thread portion 11 enters the hub bolt hole 303 of the wheel hub 30, the bottom surface 141 of the tool insertion hole 14 is located on the outer side in the vehicle width direction with respect to the wheel mounting surface 312 of the brake rotor 31. Therefore, when the wheel holding member 10 is broken at a part near the wheel mounting surface 312 of the brake rotor 31, the tool insertion hole 14 is exposed from the broken surface 16 of the broken piece 15.

When the wheel holding member 10 is broken at a position on the distal end side with respect to the bottom surface 141 of the tool insertion hole 14, the tool insertion hole 14 is not exposed from the broken surface 16. However, in this case, the broken piece 15 remaining in the wheel hub 30 has a portion protruding from the wheel mounting surface 312 of the brake rotor 31, and the portion has a certain length (at least a Length exceeding a value obtained by subtracting a thickness at the portion at which the wheel mounting surface 312 of the brake rotor 31 is provided from the length L from the boundary between the thread portion 11 and the holding portion 12 to the bottom surface 141 of the tool insertion hole 14). Therefore, the portion of the broken piece 15 remaining in the wheel hub 30, which protrudes from the wheel mounting surface 312 of the brake rotor 31 toward the outer side in the vehicle width direction, can be gripped and rotated. Therefore, in this case, the broken piece 15 can be removed even without use of the tool 40.

In addition, the wheel holding member 10 includes the holding portion 12 on the distal end side with respect to the thread portion 11 (at a portion protruding from the surface of the wheel hub 30 on the outer side in the vehicle width direction toward the outer side in the vehicle width direction under the state in which the wheel holding member 10 is mounted to the wheel hub 30). The outer periphery of the holding port-ion 12 is brought into contact with an inner peripheral surface of the hub-bolt insertion hole 322 of the wheel 32 to hold the wheel 32 so as to prevent the wheel 32 from being drop off. The inner diameter of the hub-bolt insertion hole 322 of the wheel 32 is larger than the outer diameter of the hub bolt 33 so that the hub bolt 33 can be inserted therethrough. Thus, the outer diameter of the large-diameter portion 121 of the holding portion 12 is set to a dimension larger than the outer diameter of the thread portion 11 so that a gap between an outer peripheral surface of the holding portion 12 of the wheel holding member 10 and the inner peripheral surface of the hub-bolt insertion hole 322 of the wheel 32 can be reduced. Through reduction of this gap, the displacement between the axes of the hub-bolt insertion holes 322 of the wheel 32 held by the wheel holding member 10 and the axes of the hub bolt holes 303 of the wheel hub 30 can be reduced. Therefore, the hub bolts 33 can be easily fastened, thereby improving the operability.

Further, the grip portion 13 of the wheel holding member 10 according to this embodiment has a non-circular cross section. Specifically, the grip portion 13 has the "I" shape in cross section (which can also be expressed as an "H" shape). With the grip portion 13 having such a sectional shape, when the wheel holding member 10 is to be mounted to the wheel hub 30 or removed from the wheel hub 30, an operator can easily rotate the wheel holding member 10 (in other words, the operator can easily apply torque to the wheel holding member 10). Therefore, the operability is improved.

Further, the grip portion 13 of the wheel holding member 10 according to this embodiment has a tapered shape. With such a configuration, when an operator is to mount the wheel 32, the wheel holding member 10 is easily inserted into the hub-bolt insertion hole 322 of the wheel 32. Therefore, the operability is improved.

The tool insertion hole 14 is a hole having a hexagonal shape in cross section, into which the hex wrench can be inserted. However, the tool insertion hole 14 is not limited to the hole having a hexagonal cross section. The tool insertion hole 14 may be, for example, a hole having a substantially cross-shaped cross section, a hole having a star-shaped cross section, or a hole having a rectangular shape with a flat cross section. When the tool insertion hole 14 is the hole having a substantially cross-shaped cross section, a Phillips head screwdriver (cross-head screw driver) can be applied as the tool 40 for rotating the wheel holding member 10. When the tool insertion hole 14 is the hole having a star-shaped cross section, a star-shaped screwdriver can be applied as the tool 40 for rotating the wheel holding member 10. When the tool insertion hole 14 is the hole having a rectangular shape with a flat cross section, a slotted screw driver (flathead screw driver) can be applied as the tool 40 for rotating the wheel holding member 10. In short, it is only required that the tool insertion hole 14 have such a shape that various tools can be inserted, and the broken piece 15 can ne rotated (torque can be applied to the broken piece 15) by the inserted tool 40.

There has been described the configuration in which the holding portion 12 includes the large-diameter portion 121 having a uniform cross section, and the portions 122 and 123 each having a truncated conical shape on both sides of the large-diameter portion 121. However, the holding portion 12 is not limited to such a configuration. For example, the entire holding portion 12 may have a uniform sectional shape having a diameter larger than the outer diameter of the thread portion 11.

It is only required that the sectional shape of the grip portion 13 be a shape that is easily grasped and rotated by a user (shape that is less liable to cause slippage during rotation, in other words, shape that is likely to allow application of torque), and the sectional shape of the grip portion 13 is not limited to the "I" shape. The sectional shape of the grip portion 13 may be, for example, a polygonal shape such as a square shape or a hexagonal shape. Further, the sectional shape of the grip portion 13 may be a shape having a substantially circular cross section and partially having a flat surface.

In this embodiment, there has been described the configuration in which the thread portion 11 is formed at an endmost portion on the proximal end side. However, the present invention is not limited to such a configuration. For example, the structure having a diameter smaller than a root diameter of the thread portion 11 may be formed on the proximal en side with respect to the thread portion 11. In short, it is only required that the thread portion 11 be threadedly engageable with the hub bolt hole 303 of the wheel hub 30 from the proximal end side. Further, the specific length of the thread portion 11 is also not limited. In short, it is only required that the length of the thread portion 11 be a length having coupling strength capable of holding the wheel holding member 10 and the wheel 32 (in other words, capable of supporting the weight of the wheel holding member 10 and the wheel 32) under the state in which the wheel holding member 10 is mounted to the wheel hub 30.

SECOND EMBODIMENT

Next, a second embodiment of the present invention is described. Portions to which configurations which are the same as those of the first embodiment can be applied are denoted by the same reference symbols as those of the first embodiment, and description thereof may be omitted.

Figure 6:
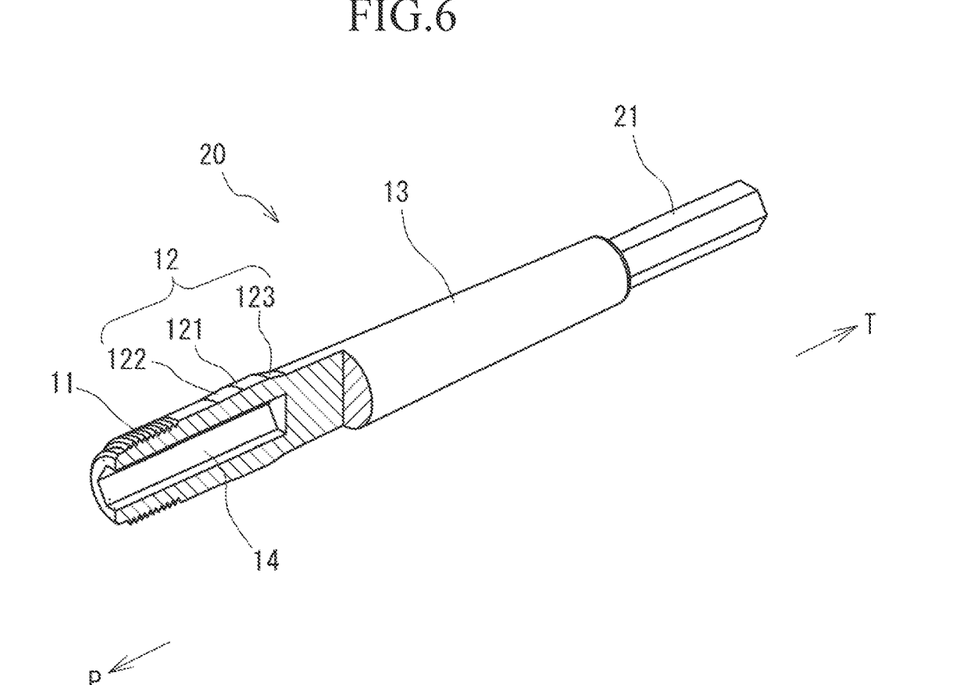
FIG. 6 is a perspective view for illustrating a configuration example of a wheel holding member according to a second embodiment of the present invention.
Figure 7:
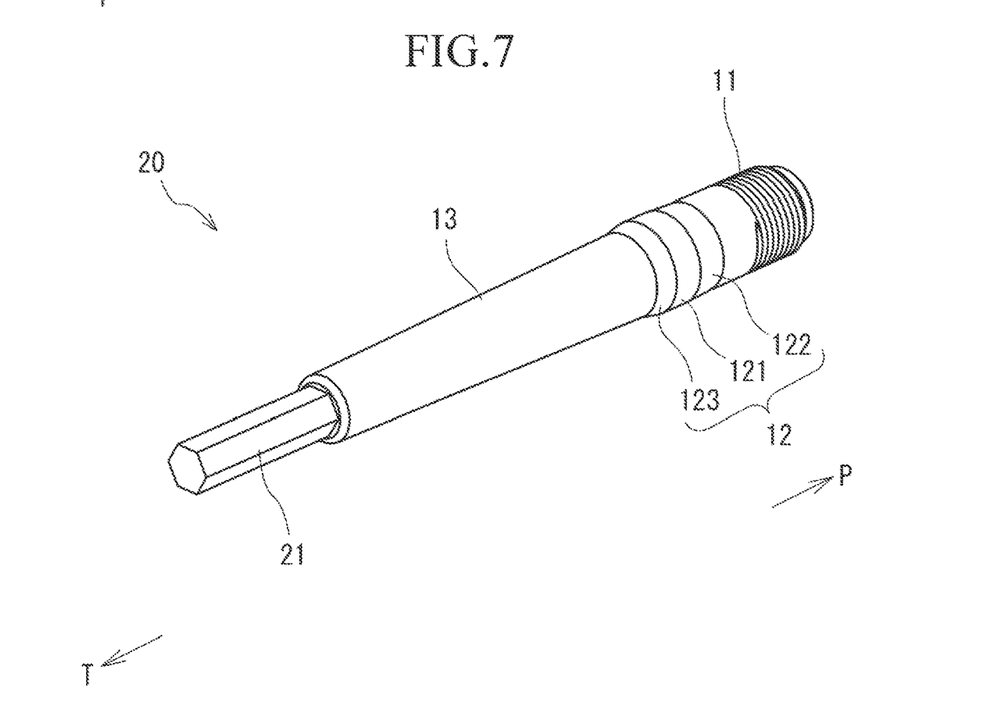
FIG. 7 is an exterior perspective view for illustrating the configuration example of the wheel holding member according to the second embodiment.

As illustrated in FIG. 6 and FIG. 7, the tool insertion hole 14 is formed on a proximal end side of a wheel holding member 20 according to the second embodiment. Meanwhile, a tool portion 21 is formed on a distal end side of the wheel holding member 20. The tool portion 21 is insertable into the tool insertion hole 24, and has a shape suitable for rotating the wheel holding member 20 (capable of applying torque to the wheel holding member 20) under the state in which the tool portion 21 is inserted into the tool insertion hole 14. Specifically, the tool portion 21 is a rod having a hexagonal cross section, and the tool insertion hole 14 is a hole having a hexagonal cross section.

As configurations of the thread portion 11 and the holding portion 12, configurations which are the same as those of the first embodiment can be applied. Further, the depth of the tool insertion hole 14 (position of the bottom surface 141 of the tool insertion hole 14) may be the same as that of the first embodiment.

As a method of use of the wheel holding member 20 according to the second embodiment, the same method as that of the first embodiment can be applied. In a case of removing the broken piece 15 remaining in the wheel hub 30 when the wheel holding member 20 is broken, in the first embodiment, the tool 40 which is separate from the wheel holding member 10 is used. In contrast, in the second embodiment, the portion of the wheel holding member 20, which is separated from the wheel hub 30 (portion other than the broken piece 15 remaining in the wheel hub 30), is used. That is, when the wheel holding member 20 is broken under the state of being mounted to the wheel hub 30, the broken piece 15 including the thread portion 11 and the tool insertion hole 14 remains in the wheel hub 30, and a broken piece including the tool portion 21 is separated from the wheel hub 30. Therefore, the tool portion 21 of the broken piece separated from the wheel hub 30 is inserted into the exposed tool insertion hole 14 of the broken piece 15 remaining in the wheel hub 30 and is rotated, thereby being capable of removing the broken piece 15 remaining in the wheel hub 30 from the wheel hub 30.

As described above, according to the second embodiment, when the wheel holding member 20 is broken under the state of being mounted to the wheel hub 30, with use of the portion (broken piece) of the wheel holding member 20, which is separated from the wheel hub 30, the broken piece 15 remaining in the wheel hub 30 can be removed from the wheel hub 30 without use of the separate tool 40 other than the wheel holding member 20. For the other configurations, the same effects as those of the first embodiment can be obtained.

The tool portion 21 is a rod (protrusion) having a hexagonal cross section, and the tool insertion hole 14 is a hole having a hexagonal cross section. However, the configurations of the tool portion 21 and the tool insertion hole 14 are not limited to such configurations. For example, the tool portion 21 may be a rod having a square-shaped cross section, and the tool insertion hole 14 may be a hole having a square-shaped cross section. Further, the tool portion 21 may be a rod having a star-shaped cross section, and the tool insertion hole 14 may be a hole having the star-shaped cross section. In short, it is only required that the tool portion 21 be insertable into the tool insertion hole 14, and the tool portion 21 is rotated under the state in which the tool portion 21 is inserted into the tool insertion hole 14, thereby being capable of rotating the broken piece 15 (torque can be applied to the broken piece 15). In other words, it is only required that the tool portion 21 have such a shape that does not allow one or more rotations in a relative sense under the state in which the tool portion 21 is inserted into the tool insertion hole 14.

Further, in this embodiment, there has been described the configuration in which the grip portion 13 has the circular cross section. However, the sectional shape of the grip portion 13 is not limited to the circular shape. The sectional shape of the grip portion 13 may be a non-circular shape such as a substantially "I" shape similar to the first embodiment, a polygonal shape, or a shape having a substantially circular cross section and partially having a flat surface.

Although the embodiments of the present invention have been described above, the present invention is not limited to the embodiments described above, and various modifications may be made thereto without departing from the gist of the invention.

What is claimed is:

1. A wheel holding member for a vehicle, which has a rod shape,
and is to be removably mounted to a wheel hub, the wheel holding member being configured to hold a wheel under a state in which the holding member is mounted to the wheel hub, the wheel holding member comprising:
a thread portion, which is formed on one end portion in an axial direction, and has a male thread formed on an outer peripheral surface thereof, the male thread being threadedly engageable with a hub bolt hole formed in the wheel hub; and
a first portion, which extends toward a side opposite to the one end portion of the thread portion, and is insertable through a hub-bolt insertion hole formed in the wheel,
wherein at least the thread portion has a tool insertion hole, which is opened at an end surface of the one end portion, and into which a tool for rotating the wheel holding member is insertable, and
wherein the tool insertion hole is formed such that a bottom surface of the tool insertion hole is located on an outer side in a vehicle width direction with respect to a surface of the wheel hub in which the hub bolt hole is formed under a state in which the thread portion is threadedly engaged with the hub bolt hole.

2. The wheel holding member for a vehicle according to claim 1, wherein the bottom surface of the tool insertion hole is located on the side opposite to the one end portion with respect to a boundary between the thread portion and the first portion.

3. The wheel holding member for a vehicle according to claim 1, wherein the first portion has a portion having an outer diameter larger than an outer diameter of the thread portion.

4. The wheel holding member for a vehicle according to claim 1, further comprising a second portion, which is formed on the side opposite to the one end portion with respect to the first portion, and has a non-circular shape in cross section taken along a plane orthogonal to the axial direction.

5. The wheel holding member for a vehicle according to claim 4, wherein the second portion has a substantially "I" shape in cross section.

6. The wheel holding member for a vehicle according to claim 4, wherein the second portion has a tapered shape that becomes thinner toward an end portion on the side opposite to the one end portion.

7. The wheel holding member for a vehicle according to claim 1, further comprising a tool portion, which is formed on the end portion on the side opposite to the one end portion, is insertable into the tool insertion hole, and is capable of rotating the wheel holding member under a state in which the tool portion is inserted into the tool insertion hole.

8. The wheel holding member for a vehicle according to claim 7,
wherein the tool insertion hole is a hole having a hexagonal cross section, and
wherein the tool portion is a rod-shaped portion having a hexagonal cross section.

\* \* \* \* \*